(12) United States Patent
Fujisawa et al.

(10) Patent No.: US 11,524,726 B2
(45) Date of Patent: Dec. 13, 2022

(54) BODY STRUCTURE FOR AUTOMOBILES

(71) Applicant: HONDA MOTOR CO., LTD., Tokyo (JP)

(72) Inventors: Kota Fujisawa, Wako (JP); Takashi Yamada, Wako (JP); Kanji Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 266 days.

(21) Appl. No.: 17/044,508

(22) PCT Filed: Apr. 10, 2019

(86) PCT No.: PCT/JP2019/015608
§ 371 (c)(1),
(2) Date: Oct. 1, 2020

(87) PCT Pub. No.: WO2019/198753
PCT Pub. Date: Oct. 17, 2019

(65) Prior Publication Data
US 2021/0107571 A1    Apr. 15, 2021

(30) Foreign Application Priority Data
Apr. 11, 2018    (JP) .............................. JP2018-076262

(51) Int. Cl.
*B62D 25/20*    (2006.01)
*B60K 1/04*    (2019.01)

(52) U.S. Cl.
CPC ............ *B62D 25/2036* (2013.01); *B60K 1/04* (2013.01); *B60K 2001/0416* (2013.01);
(Continued)

(58) Field of Classification Search
CPC ............ B62D 25/2036; B62D 25/2018; B62D 25/2027; B62D 25/08; B60K 1/04;
(Continued)

(56) References Cited

U.S. PATENT DOCUMENTS 10,661,840 B1 *   5/2020   Saje ................... B62D 25/2018
2020/0172167 A1 *  6/2020   Watanabe ............ B62D 21/155
(Continued)

FOREIGN PATENT DOCUMENTS

JP    H05-162661    6/1993
JP    2015-003552   1/2015
(Continued)

OTHER PUBLICATIONS

International Search Report, dated Jul. 2, 2019 (Jul. 2, 2019), 1 page.

*Primary Examiner* — D Glenn Dayoan
*Assistant Examiner* — E Turner Hicks
(74) *Attorney, Agent, or Firm* — Rankin, Hill & Clark LLP

(57) ABSTRACT

The rear frame includes an inclined part that is inclined inward in, a vehicle width direction in going rearward and a horizontal part that extends rearward from a rear end of the inclined part. A rear part of the side sill includes a first enlarged width portion that increases in width inwardly in the vehicle width direction via a bent portion. A front part of the rear frame inclined part includes a second enlarged width portion that increases in width outwardly in the vehicle width direction. A rear end of the first enlarged width portion and a front end of the second enlarged width portion are connected. An inner wall in the vehicle width direction of the first enlarged width portion and an inner wall in the vehicle width direction of the inclined part are linearly continuous in plan view.

10 Claims, 6 Drawing Sheets

(52) U.S. Cl.
CPC .. *B60K 2001/0438* (2013.01); *B62D 25/2018* (2013.01); *B62D 25/2027* (2013.01)

(58) Field of Classification Search
CPC .... B60K 2001/0416; B60K 2001/0438; B60Y 2306/01
USPC .......... 296/204, 187.12, 209, 203.04, 193.08
See application file for complete search history.

(56) References Cited

U.S. PATENT DOCUMENTS

| | | | |
|---|---|---|---|
| 2020/0231217 A1* | 7/2020 | Murata | B62D 25/08 |
| 2020/0231221 A1* | 7/2020 | Tsukamoto | B60N 2/005 |
| 2020/0269928 A1* | 8/2020 | Ishimoto | B62D 25/087 |
| 2020/0269933 A1* | 8/2020 | Ryu | B62D 25/025 |

FOREIGN PATENT DOCUMENTS

| | | |
|---|---|---|
| JP | 2016-141289 | 8/2016 |
| JP | 2017-043158 | 3/2017 |
| WO | 2016/098567 | 6/2016 |
| WO | 2016/098567 | 9/2017 |

\* cited by examiner

BODY STRUCTURE FOR AUTOMOBILES

TECHNICAL FIELD

The present invention relates to a body structure for automobiles in which front ends of a pair of left and right rear frames made of a hot stamp material are connected to rear ends of a pair of left and right side sills made of a high tensile material.

BACKGROUND ART

An arrangement in which the plate thickness of an upper half part of a rear frame made of a hot stamp material is set to be larger than the plate thickness of a lower half part, and a first soft zone, a second soft zone, and a third soft zone are formed in the rear frame so as to be spaced in the fore-and-aft direction at predetermined intervals, thus making the rear frame crumple in a zig-zag manner when the collision load of a rear-end collision is inputted thereinto and absorbing the collision energy, is known from Patent Document 1 below.

Furthermore, an arrangement in which a soft zone that is inclined from upper front to lower rear is formed in a rear frame made of a hot stamp material, thus making the rear frame be bent into a Z shape when the collision load of a rear-end collision is inputted thereinto and thereby absorbing the collision energy, is known from Patent Document 2 below.

PRIOR ART DOCUMENTS

Patent Documents

Patent Document 1: Japanese Patent Application Laid-open No. 2017-43158
Patent Document 2: International Patent Application Laid-open No. WO2016/098567

SUMMARY OF THE INVENTION

Problems to be Solved by the Invention

However, in the arrangements described in Patent Document 1 and Patent Document 2, since it is necessary to form a soft zone in part of a rear frame made of a hot stamp material, there is the problem that the production cost will increase.

The present invention has been accomplished in light of the above circumstances, and it is an object thereof to enhance the energy-absorbing effect when an automobile vehicle body equipped with a rear frame made of a hot stamp material is involved in a rear-end collision.

Means for Solving the Problems

In order to attain the above object, according to a first aspect of the present invention, there is provided a body structure for automobiles in which front ends of a pair of left and right rear frames made of a hot stamp material are connected to rear ends of a pair of left and right side sills made of a high tensile material, wherein the rear frame comprises an inclined part that is inclined inward in a vehicle width direction in going rearward and a horizontal part that extends substantially horizontally rearward from a rear end of the inclined part, a rear part of the side sill comprises a first enlarged width portion that increases in width inwardly in the vehicle width direction via a bent portion, a front part of the inclined part of the rear frame comprises a second enlarged width portion that increases in width outwardly in the vehicle width direction, a rear end of the first enlarged width portion and a front end of the second enlarged width portion are connected, and an inner wall in the vehicle width direction of the first enlarged width portion and an inner wall in the vehicle width direction of the inclined part are linearly continuous in plan view.

Further, according to a second aspect of the present invention, in addition to the first aspect, the structure comprises a battery box mounted in a lower part of a vehicle body, the bent portion of the side sill opposes a corner portion in a rear part of the battery box, and the inclined parts of the left and right rear frames are connected by a rear cross member extending in the vehicle width direction.

Furthermore, according to a third aspect of the present invention, in addition to the second aspect, the inclined part of the rear frame and the rear cross member are connected by a reinforcing member having a triangular shape in plan view.

Moreover, according to a fourth aspect of the present invention, in addition to the third aspect, the rear cross member and a floor cross member providing a connection between the left and right side sills in the vehicle width direction are connected by a floor frame extending in a fore-and-aft direction.

Further, according to a fifth aspect of the present invention, in addition to the second aspect, the side sill is formed into a closed cross-section by joining an outer member and an inner member, the inner member has a U-shaped cross section opening outward in the vehicle width direction while having an upper wall, a side wall and a lower wall, opposite side edges in the vehicle width direction of a floor panel are connected to the upper wall, the battery box is connected to the lower wall, and the side wall opposes a peripheral wall portion of the battery box.

Furthermore, according to a sixth aspect of the present invention, in addition to the second aspect, the inclined part of the rear frame is also inclined upward in going rearward, the structure comprises a subframe disposed between the left and right rear frames, and the subframe is supported on the inclined part so as to oppose a rear face of the battery box.

Moreover, according to a seventh aspect of the present invention, in addition to the first aspect, the structure comprises a rear floor panel having formed thereon an upwardly-bulging portion inclined upward in going rearward from the rear end of a floor panel, and the floor panel has a floor frame disposed on a lower face thereof in the fore-and-aft direction, the rear end of the floor frame being connected to a lower face of a rear cross member disposed on a lower face of the upwardly-bulging portion of the rear floor panel in the vehicle width direction.

Further, according to an eighth aspect of the present invention, in addition to the first aspect, a front part of the side sill is formed from a material having higher strength than the strength of a rear part thereof, the front part of the side sill is connected to a front side frame by a brace member, the left and right side sills are connected by a floor cross member extending in the vehicle width direction, and the rear frame is connected to the rear part of the side sill.

Furthermore, according to a ninth aspect of the present invention, in addition to the first aspect, a bulkhead is disposed at the front end of the second enlarged width portion of the rear frame.

Moreover, according to a tenth aspect of the present invention, in addition to the ninth aspect, the structure comprises a subframe disposed between the left and right rear frames, and a fastening part on a front side of the subframe is provided in a vicinity of the bulkhead of the rear frame.

An outrigger 30 of an embodiment corresponds to a brace member of the present invention.

Effects of the Invention

In accordance with the first aspect of the present invention, the front ends of the pair of left and right rear frames made of a hot stamp material are connected to the rear ends of the pair of left and right side sills made of a high tensile material. Since the rear frame includes the inclined part, which is inclined inward in the vehicle width direction in going rearward, and the horizontal part, which extends substantially horizontally rearward from the rear end of the inclined part, the rear part of the side sill includes the first enlarged width portion, which increases in width inwardly in the vehicle width direction via the bent portion, the front part of the inclined part of the rear frame includes the second enlarged width portion which increases in width outwardly in the vehicle width direction, the rear end of the first enlarged width portion and the front end of the second enlarged width portion are connected, and the inner wall in the vehicle width direction of the first enlarged width portion and the inner wall in the vehicle width direction of the inclined part are linearly continuous in plan view, not only can the rear frame be formed from a hot stamp material to thus lighten the weight while ensuring the strength, but it is also possible, when the collision load of a rear-end collision inputted into the rear end of the rear frame is transmitted to the bent portion at the rear end of the side sill, for the bent portion of the side sill formed from a high tensile material having lower tensile strength and higher ductility than the hot stamp material to be deformed, and for the inclined part of the rear frame to be deformed while collapsing inward in the vehicle width direction, thus enabling the collision energy of the rear-end collision to be absorbed effectively.

Furthermore, in accordance with the second aspect of the present invention, since it includes the battery box mounted in a lower part of a vehicle body, the bent portion of the side sill opposes the corner portion in a rear part of the battery box, and the inclined parts of the left and right rear frames are connected by the rear cross member extending in the vehicle width direction, due to the cross member becoming taut in the vehicle width direction when the collision load of a rear-end collision is inputted into the rear frame, the bent portion of the side sill can be prevented from moving inward in the vehicle width direction, thus preventing it from interfering with the corner portion in the rear part of the battery box.

Moreover, in accordance with the third aspect of the present invention, since the inclined part of the rear frame and the rear cross member are connected by the reinforcing member having a triangular shape in plan view, it is possible to transmit and disperse the collision load inputted into one of the left and right rear frames at the time of an offset rear-end collision to the other one of the left and right rear frames via the reinforcing member and the rear cross member.

Furthermore, in accordance with the fourth aspect of the present invention, since the rear cross member and the floor cross member providing a connection between the left and right side sills in the vehicle width direction are connected by the floor frame extending in the fore-and-aft direction, a rectangular skeleton that is resistant to deformation is formed from the side sill, the floor cross member, the floor frame, and the rear cross member, and it is possible to protect the battery box disposed therebeneath and to reliably transmit and disperse the collision load of a rear-end collision from the rear frame to the side sill.

Moreover, in accordance with the fifth aspect of the present invention, since the side sill is formed into a closed cross-section by joining the outer member and the inner member, the inner member has a U-shaped cross section opening outward in the vehicle width direction while having the upper wall, the side wall, and the lower wall, opposite side edges in the vehicle width direction of the floor panel are connected to the upper wall, the battery box is connected to the lower wall, and the side wall opposes the peripheral wall portion of the battery box, it is possible to dispose the battery box across the entire width in the vehicle width direction of the lower face of the floor panel, thus enabling a large capacity battery to be mounted.

Furthermore, in accordance with the sixth aspect of the present invention, since the inclined part of the rear frame is also inclined upward in going rearward, the structure includes the subframe disposed between the left and right rear frames, and the subframe is supported on the inclined part so as to oppose the rear face of the battery box, the collision load of a rear-end collision is transmitted from the subframe to the side sill via the rear frame, and it is thus possible to protect the battery box, which is disposed in front of the subframe.

Moreover, in accordance with the seventh aspect of the present invention, since it includes the rear floor panel having formed thereon the upwardly-bulging portion inclined upward in going rearward from the rear end of the floor panel, and the floor panel has the floor frame disposed on the lower face thereof in the fore-and-aft direction, the rear end of the floor frame being connected to the lower face of the rear cross member disposed on the lower face of the upwardly-bulging portion of the rear floor panel in the vehicle width direction, even if the height of the floor frame is reduced in order to increase the volume of the battery box, it is possible to reliably transmit the collision load of a rear-end collision from the rear cross member to the floor frame.

Furthermore, in accordance with the eighth aspect of the present invention, since the front part of the side sill is formed from a material having higher strength than that of the rear part thereof, the front part of the side sill is connected to the front side frame by the brace member, the left and right side sills are connected by the floor cross member extending in the vehicle width direction, and the rear frame is connected to the rear part of the side sill, it is possible to ensure high collision resistance for a frontal collision or a side collision in addition to a rear-end collision.

Moreover, in accordance with the ninth aspect of the present invention, since the bulkhead is disposed at the front end of the enlarged width portion of the rear frame, it is possible, by increasing the difference in stiffness between the rear frame and the side sill, to promote deformation of the low strength side sill at the time of a rear-end collision.

Furthermore, in accordance with the tenth aspect of the present invention, since it includes the subframe disposed between the left and right rear frames, and the fastening part on the front side of the subframe is provided in the vicinity of the bulkhead of the rear frame, the rear frame can support the collision load transmitted from the subframe without the cross section collapsing.

EXPLANATION OF REFERENCE NUMERALS AND SYMBOLS

Figure 1:
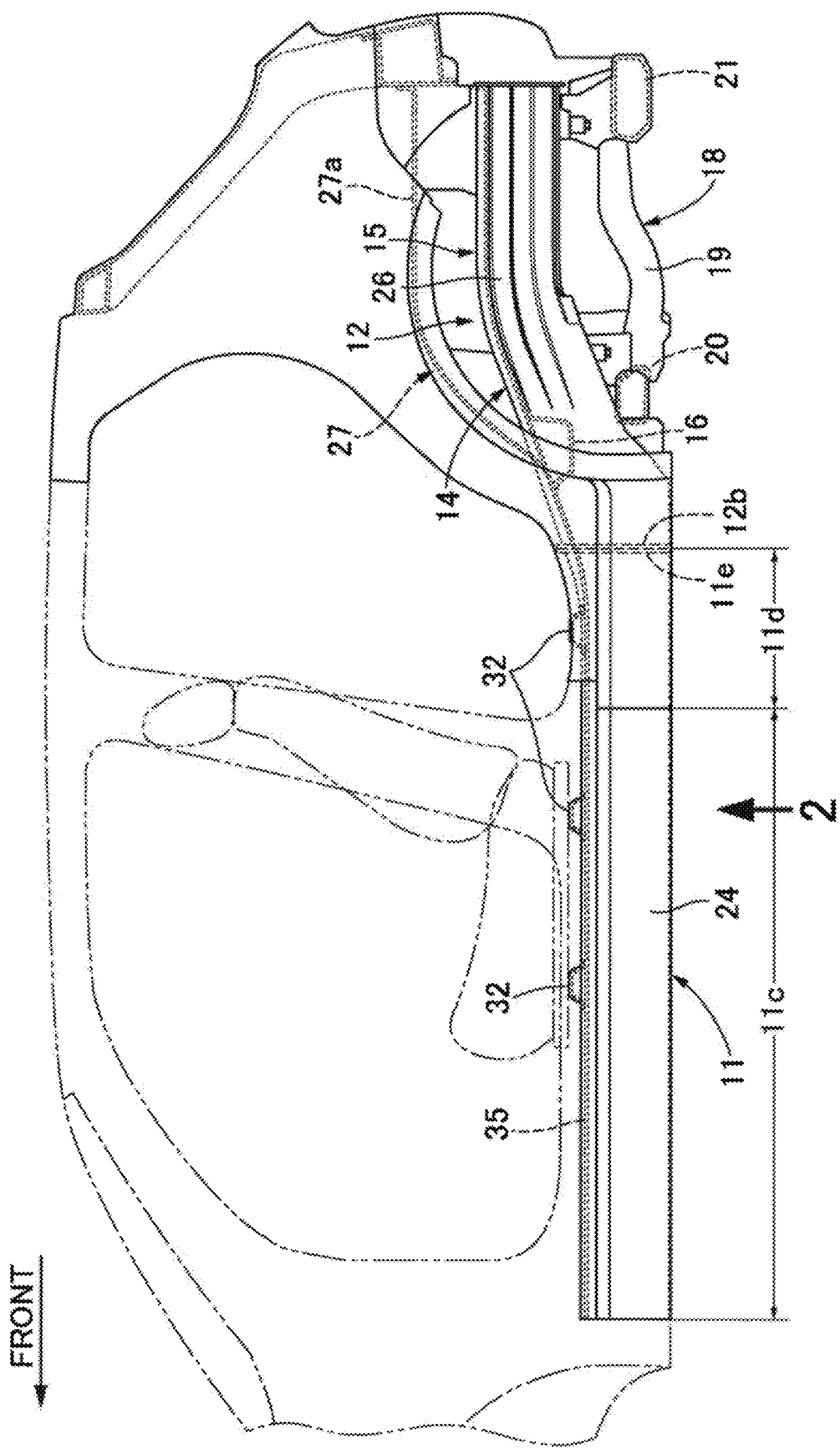
FIG. 1 is a left side view of a vehicle body rear part of an automobile. (first embodiment)

11 Side sill
11a First enlarged width portion
11b Bent portion
12 Rear frame
12a Second enlarged width portion
14 Inclined part
15 Horizontal part
16 Rear cross member
17 Reinforcing member
18 Subframe
23 Inner member
23a Upper wall
23b Side wall
23c Lower wall
24 Outer member
27 Rear floor panel
27a Upwardly-bulging portion
30 Outrigger (brace member)
31 Front side frame
32 Floor cross member
33 Floor frame
34 Bulkhead
35 Floor panel
36 Battery box
36a Corner portion
36b Peripheral wall portion
46 Fastening part Modes for Carrying Out the Invention An embodiment of the present invention is explained below by reference to FIG. 1 to FIG. 6. In the present specification, the fore-and-aft direction, the left-and-right direction (vehicle width direction), and the vertical direction are defined with reference to an occupant seated on a driver's seat.

First Embodiment

Figure 2:
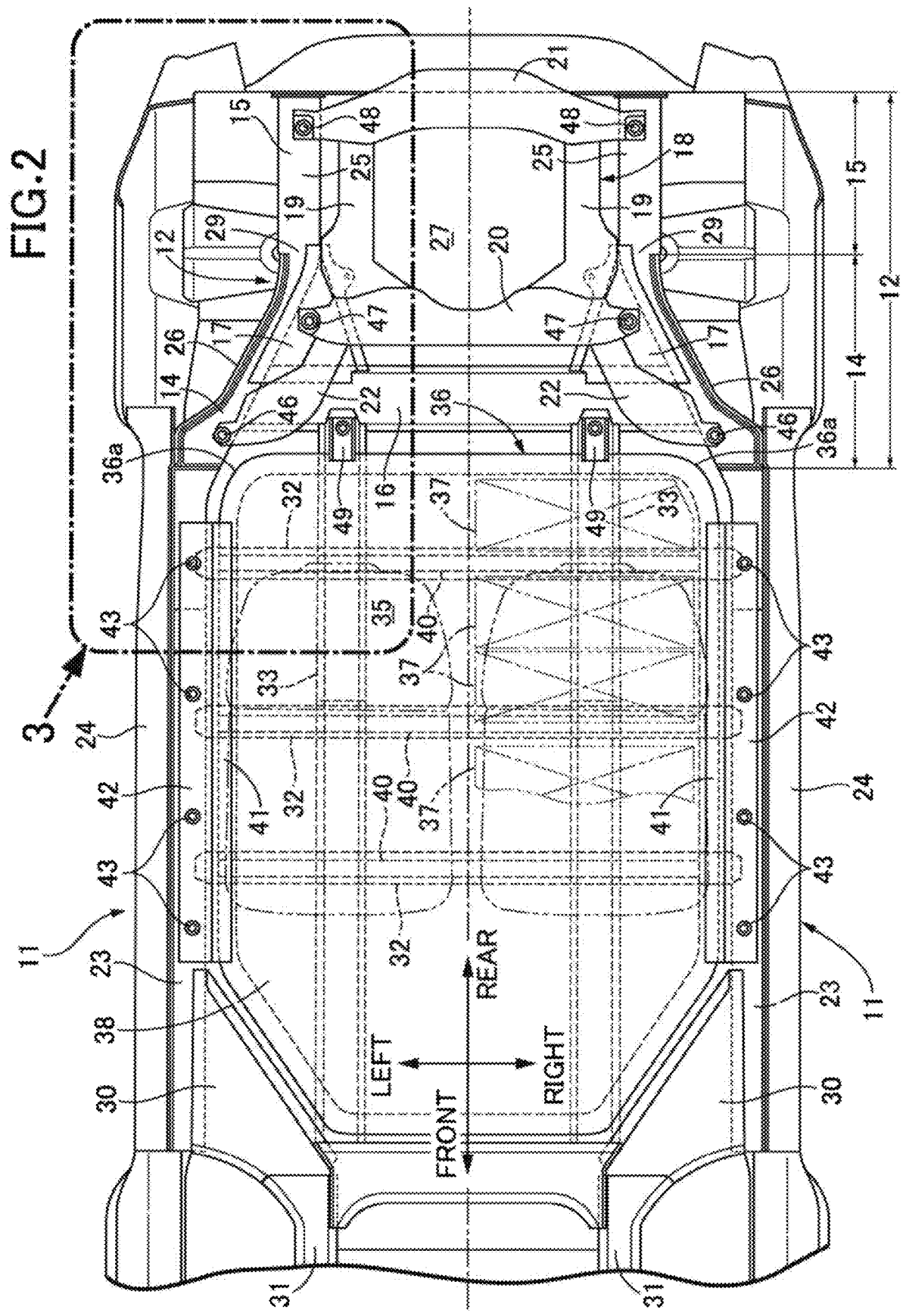
FIG. 2 is a view in the direction of arrow 2 in FIG. 1. (first embodiment)
Figure 3:
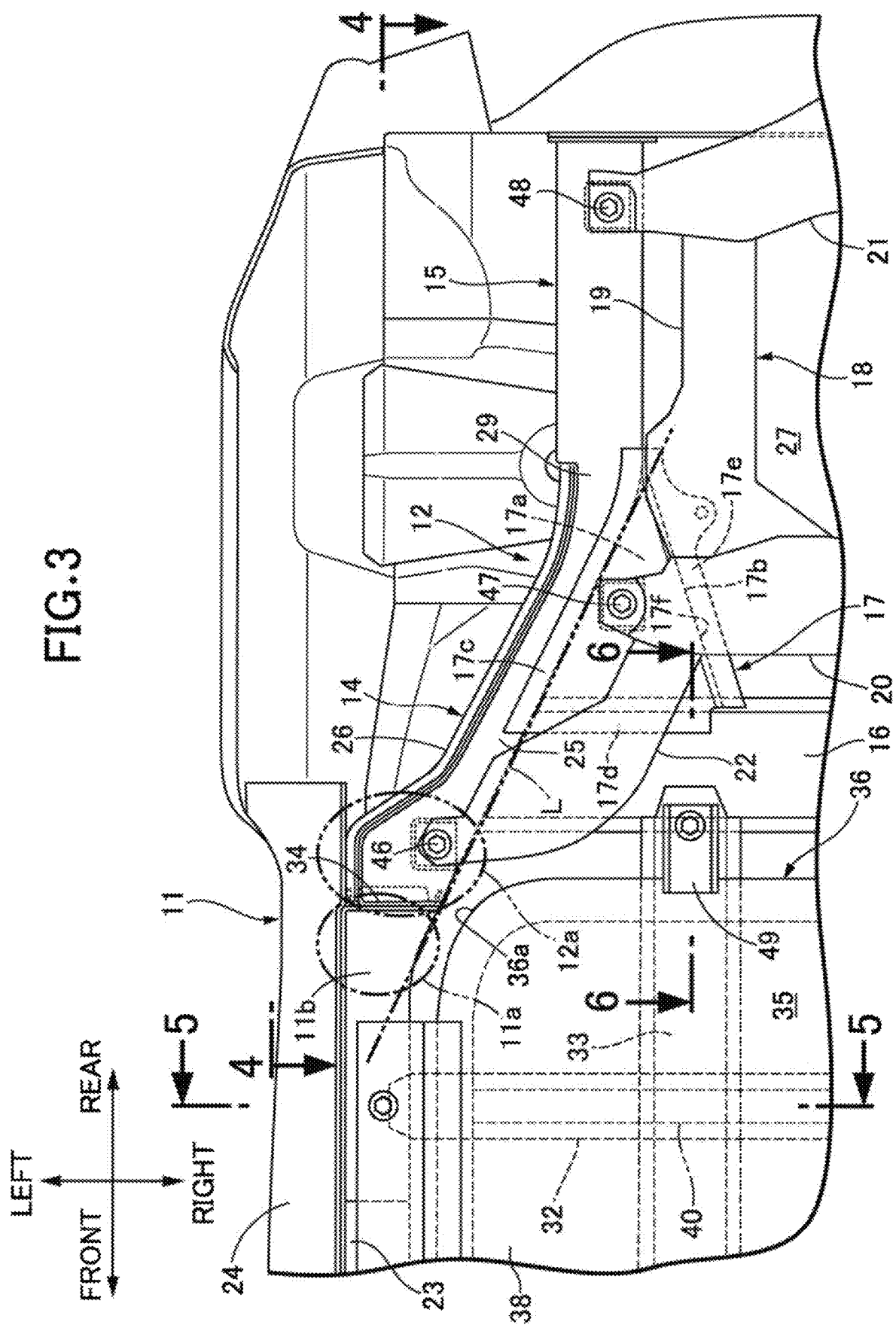
FIG. 3 is an enlarged view of part 3 in FIG. 2. (first embodiment)

As shown in FIG. 1 to FIG. 3, a pair of left and right side sills 11 are disposed on a side part of a vehicle body of an electric automobile in the fore-and-aft direction, and a pair of left and right rear frames 12 are connected to rear ends of the left and right side sills 11. The rear frame 12 is formed from an inclined part 14 on the front side and a horizontal part 15 on the rear side, the inclined part 14 extending upward and inward in the vehicle width direction in going rearward from the rear end of the side sill 11, and the horizontal part 15 extending linearly rearward from the rear end of the inclined part 14. The inclined parts 14 of the left and right rear frames 12 are connected by a rear cross member 16 extending in the vehicle width direction, and the rear side of the rear cross member 16 and the inner side in the vehicle width direction of the inclined part 14 are connected and reinforced by a reinforcing member 17 having a triangular shape in plan view. The rear frame 12 is made of a hot stamp material, and the side sill 11 is made of a high tensile material.

Since a hot stamp material is one that is hot press formed using a mold in a state in which a steel plate is heated at about 900° and cooled to normal temperature in the mold, not only can a very high strength press product be produced but it is also possible to make the plate thickness thin due to the high strength, thus lightening the weight. Moreover, compared with cold press forming, it is difficult for spring-back of the material to occur, thus improving the precision of the press product.

A high tensile material is a high tensile steel that has lower strength than that of a hot stamp material; since it is cold press formed the equipment cost is suppressed and it can be produced at low cost, but the precision of a press product is sometimes degraded due to spring-back of the material at the time of cold press forming. The tensile strength of a hot stamp material is for example 1300 MPa, and the tensile strength of a high tensile material is for example 980 MPa.

Mounted between the left and right rear frames 12 is a rectangular frame-shaped subframe 18 supporting a high voltage electrical component such as an electric motor for traveling. The subframe 18 includes a pair of left and right side frames 19 extending in the fore-and-aft direction along the inner side in the vehicle width direction of the left and right rear frames 12, a front cross member 20 connecting front ends of the left and right side frames 19 in the vehicle width direction, a rear part cross member 21 connecting rear ends of the left and right side frames 19 in the vehicle width direction, and a pair of left and right mounting arm parts 22 extending so as to be inclined forward and outward in the vehicle width direction from opposite ends in the vehicle width direction of the front cross member 20.

Figure 4:
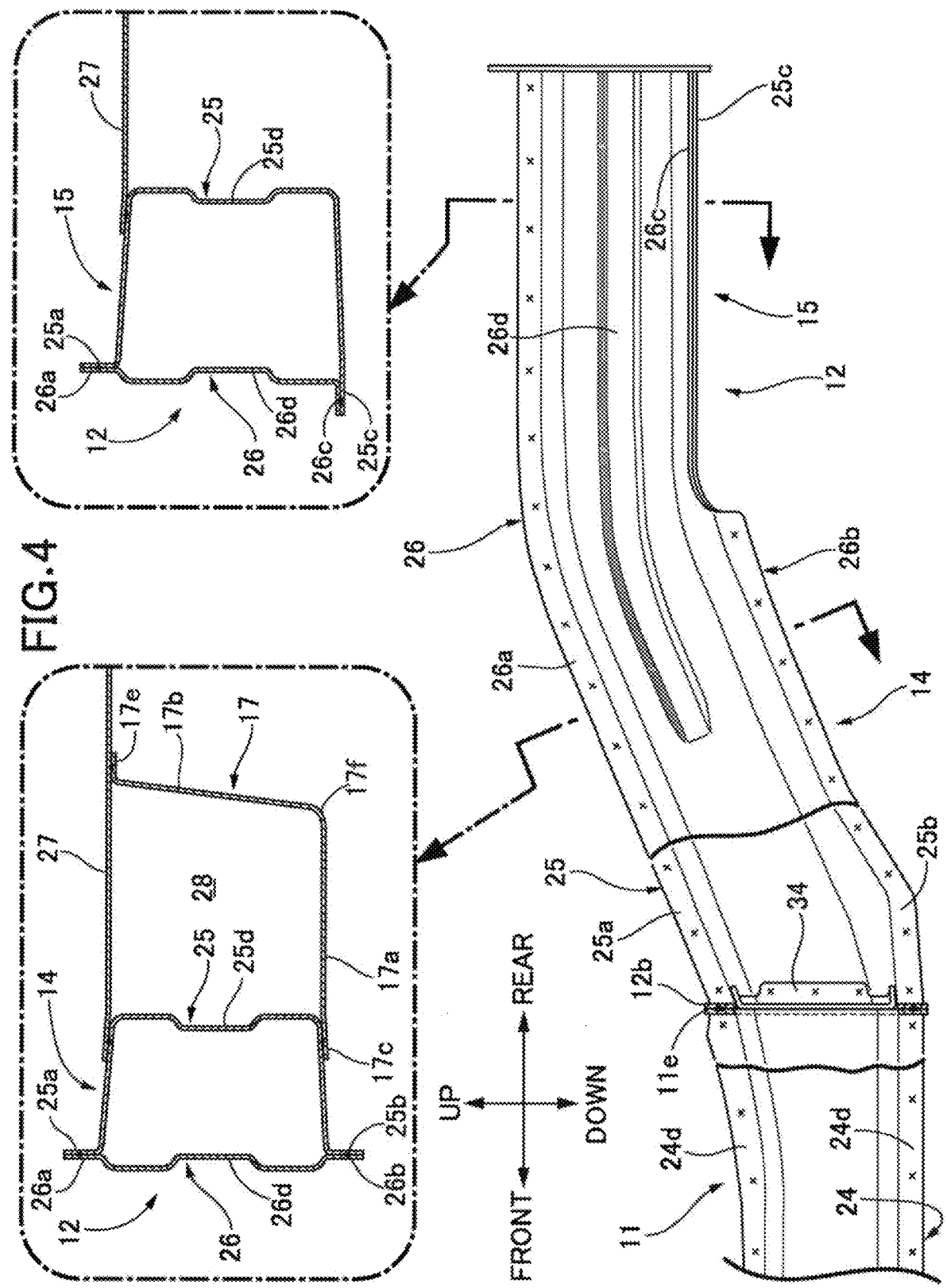
FIG. 4 is a sectional view along line 4-4 in FIG. 3. (first embodiment)
Figure 5:
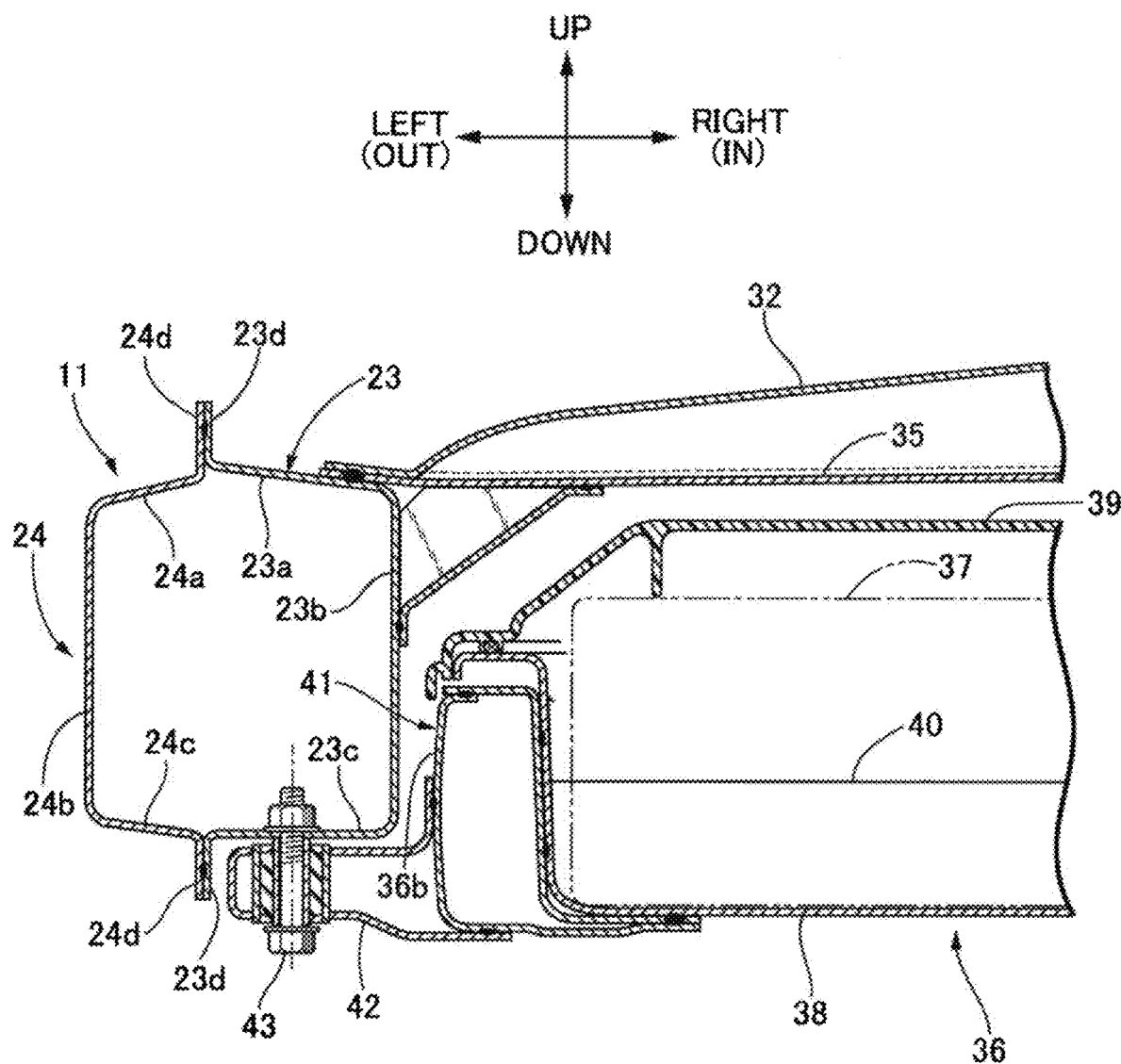
FIG. 5 is a sectional view along line 5-5 in FIG. 3. (first embodiment)

As is clear from FIG. 3 to FIG. 5, the side sill 11 is formed from an inner member 23 having a hat-shaped cross section opening outward in the vehicle width direction while having an upper wall 23a, a side wall 23b, a lower wall 23c, and upper and lower joining flanges 23d, and an outer member 24 having a hat-shaped cross section opening inward in the vehicle width direction while having an upper wall 24a, a side wall 24b, and a lower wall 24c, and upper and lower joining flanges 24d, and is formed into a hollow closed cross-section by connecting the inner member 23 and the outer member 24 via the joining flanges 23d and 24d. Formed on a rear end part of the side sill 11 is a first enlarged width portion 11a (see FIG. 3) in which the inner member 23 bulges obliquely inward in the vehicle width direction via a bent portion 11b. Furthermore, a front half portion 11c of the side sill 11 is formed so as to have a high strength by increasing the plate thickness compared with that of a rear half portion 11d (see FIG. 1).

Front ends of the left and right side sills 11 are connected to rear ends of a pair of left and right front side frames 31 disposed in the fore-and-aft direction in a vehicle body front part via a pair of left and right outriggers 30 extending inward in the vehicle width direction. The upper walls 23a of the inner members 23 of the left and right side sills 11 are connected by a floor panel 35. Provided on an upper face of the floor panel 35 are a plurality of floor cross members 32 extending in the vehicle width direction and connecting the left and right side sills 11, and provided on a lower face of the floor panel 35 are a pair of left and right floor frames 33 extending in the fore-and-aft direction and connecting a lower wall of the rear cross member 16 and a lower position of the rearmost floor cross member 32.

On the other hand, as is clear from FIG. 3 and FIG. 4, the rear frame 12 is formed into a hollow closed cross-section connecting an inner member 25 having a hat-shaped cross section opening outward in the vehicle width direction and an outer member 26 having a flat cross section. On an upper face side of the rear frame 12, a joining flange 25a of the inner member 25 and a joining flange 26a of the outer member 26 extend in the vertical direction, but on a lower face side of the inclined part 14 of the rear frame 12, a joining flange 25b of the inner member 25 and a joining flange 26b of the outer member 26 extend in the vertical direction, and on a lower face side of the horizontal part 15 of the rear frame 12, a joining flange 25c of the inner member 25 and a joining flange 26c of the outer member 26 extend in the horizontal direction. That is, on the lower face side of the rear frame 12, with regard to the joining flanges 25b and 26b of the inclined part 14 and the joining flanges 25c and 26c of the horizontal part 15, the direction is switched from the vertical direction to the horizontal direction. Reinforcing beads 25d and 26d are formed on an inner face in the vehicle width direction and an outer face in the vehicle width direction of the rear frame 12 along the longitudinal direction.

Formed on a front end part of the inclined part 14 of the rear frame 12 is a second enlarged width portion 12a in which the outer member 26 bulges outward in the vehicle width direction, and disposed on a front part of the second enlarged width portion 12a is a bulkhead 34. The first enlarged width portion 11a of the side sill 11 and the second enlarged width portion 12a of the rear frame 12 are connected while joining flanges 11e and 12b protruding in the vertical direction and in the vehicle width direction are abutted against each other. In this state, inner walls in the vehicle width direction of the first enlarged width portion 11a of the side sill 11 and the inclined part 14 of the rear frame 12 are inclined in plan view into a linear shape inward in the vehicle width direction in going rearward (see bold chain line L in FIG. 3).

The reinforcing member 17 is formed into an L-shaped cross section having a triangular horizontal wall 17a and a rectangular vertical wall 17b. Joining flanges 17c and 17d along two sides of the horizontal wall 17a are connected to a lower face of the inclined part 14 of the rear frame 12 and a lower face of the rear cross member 16, and a joining flange 17e of the vertical wall 17b is connected to an upwardly-bulging portion 27a in which a rear floor panel 27 connecting upper faces of the left and right rear frames 12 bulges upward to the rear. As a result, a box structure part 28 (see upper left of FIG. 4) is formed between the inclined part 14 of the rear frame 12, the rear cross member 16, the reinforcing member 17, and the rear floor panel 27. In this process, a ridge line 17f of the reinforcing member 17 connects a bent portion 29 on the border between the inclined part 14 and the horizontal part 15 of the rear frame 12 and a ridge line 16a on a rear part of the rear cross member 16.

As is clear from FIG. 2, with regard to the subframe 18, which supports a high voltage electrical component such as an electric motor, the left and right mounting arm parts 22 are fastened to lower faces of the inclined parts 14 of the left and right rear frames 12 via a fastening part 46, opposite end parts in the vehicle width direction of the front cross member 20 are fastened to lower faces of the left and right reinforcing members 17 via a fastening part 47, and opposite end parts in the vehicle width direction of the rear part cross member 21 are fastened to lower faces of the horizontal parts 15 of the left and right rear frames 12 via a fastening part 48.

As shown in FIG. 2, FIG. 3, FIG. 5 and FIG. 6, a battery box 36 for driving the electric motor for traveling is mounted beneath the floor panel 35 connecting the inner members 23 of the left and right side sills 11. The battery box 36 includes a case 38 housing a plurality of battery modules 37 in the interior, a cover 39 blocking an upper face opening of the case 38, a plurality of battery box cross members 40 fixed to an upper face of a bottom wall of the case 38 and extending in the vehicle width direction, a pair of left and right longitudinal frames 41 fixed to outer faces of left and right side walls of the case 38 and extending in the fore-and-aft direction, and a mounting bracket 42 protruding outward in the vehicle width direction from the longitudinal frame 41, the battery box 36 being mounted on lower faces of the inner members 23 of the left and right side sills 11 by means of a plurality of bolts 43 extending upward through the mounting bracket 42. Therefore, in a state in which the battery box 36 is mounted, an outer face in the vehicle width direction of the longitudinal frame 41, that is, a peripheral wall portion 36b of the battery box 36, opposes the inner member 23 of the side sill 11.

The plurality of floor cross members 32 extending in the vehicle width direction and connecting the inner members 23 of the left and right side sills 11 are provided on an upper face of the floor panel 35 above the battery box 36, and the pair of left and right floor frames 33 extending forward from the rear cross member 16 connecting the left and right rear frames 12 in the vehicle width direction are provided on a lower face of the floor panel 35. The lower end of a bracket 49 having the upper end fixed to the lower face of the rear cross member 16 is connected to a lower face of the rear end of the case 38 of the battery box 36.

Therefore, in front of connected parts via which the left and right rear frames 12 and the left and right side sills 11 are connected, the battery box cross member 40 and the floor cross member 32 are disposed between the left and right side sills 11 in the vehicle width direction, and to the rear of the connected parts the left and right rear frames 12 are connected via the rear cross member 16 extending in the vehicle width direction.

The operation of the embodiment of the present invention having the above arrangement is now explained.

Since the left and right rear frames 12 are formed from a hot stamp material, compared with a case in which they are formed from a high tensile material, it is possible to lighten the weight while ensuring the strength. If the rear frame 12 and the side sill 11 were both formed from a hot stamp material, on the input of the collision load of a rear-end collision into the rear frame 12 a split would occur in a stress concentration part of the rear frame 12 or the side sill 11, and there is a possibility that the collision energy-absorbing effect would be impaired. However, since the side sill 11, to which the front end of the inclined part 14 of the rear frame 12 is connected, is formed from a high tensile material having a lower tensile strength but higher ductility than a hot stamp material, and the inner wall in the vehicle width direction of the first enlarged width portion 11a of the side sill 11 and the inner wall in the vehicle width direction of the inclined part 14 of the rear frame 12 are continuous as an inclined linear shape in plan view, when the collision load of a rear-end collision inputted into the rear end of the rear frame 12 is transmitted to the bent portion 11b at the rear end of the side sill 11, the bent portion 11b of the side sill 11 is deformed, and the inclined part 14 of the rear frame 12 is deformed while collapsing inward in the vehicle width direction, thus enabling the collision energy of the rear-end collision to be absorbed effectively.

In this arrangement, since the bulkhead 34 is disposed at the front end of the inclined part 14 of the rear frame 12, the difference in stiffness between the inclined part 14 of the rear frame 12 and the rear part of the side sill 11 increases, and deformation of the side sill 11, which has a lower strength than that of the rear frame 12, can thus be promoted at the time of a rear-end collision. Furthermore, since the fastening part 46 of the subframe 18 disposed between the left and right rear frames 12 is provided in the vicinity of the bulkhead 34 of the rear frame 12, the rear frame 12 can support the collision load of a rear-end collision transmitted from the subframe 18 without the cross section collapsing.

Moreover, since the box structure part 28 is formed by connecting the inclined part 14 of the rear frame 12, the rear cross member 16, and the rear floor panel 27 by means of the reinforcing member 17 having a triangular shape in plan view, it is possible to transmit the collision load inputted into one of the left and right rear frames 12 at the time of an offset rear-end collision to the other one of the left and right rear frames 12 via the reinforcing member 17 and the rear cross member 16.

Furthermore, since the front half portion 11*c* of the side sill 11 is formed from a material having a higher strength than that of the rear half portion 11*d*, moreover, a front part of the side sill 11 is connected to the front side frame 31 by the outrigger 30, the left and right side sills 11 are connected by the floor cross member 32 extending in the vehicle width direction, and the rear frame 12 is connected to a rear part of the side sill 11, it is possible to ensure high collision resistance for a frontal collision or a side collision in addition to a rear-end collision.

When the vehicle is involved in a rear-end collision, it is necessary to protect the battery box 36, which houses a high voltage battery, and since the subframe 18 is supported on the rear frame 12 via the three fastening parts 46, 47, and 48 on each of the left and right, the collision load inputted into the subframe 18 is transmitted to the rear frame 12 via the fastening parts 46, 47, and 48, and further to the side sill 11, and it is thus possible to protect the battery box 36, which is disposed in front of the subframe 18.

The bent portion 11*b* of the side sill 11 opposes the corner portion 36*a* in a rear part of the battery box 36, and when the inclined part 14 of the rear frame 12 is collapsed inward in the vehicle width direction by the collision load of a rear-end collision, since the inclined parts 14 of the left and right rear frames 12 are connected by the rear cross member 16, due to the cross member 16 becoming taut in the vehicle width direction when the collision load of a rear-end collision is inputted into the rear frame 12, the bent portion 11*b* of the side sill 11 can be prevented from moving inward in the vehicle width direction, thus preventing it from interfering with the corner portion 36*a* in the rear part of the battery box 36.

Furthermore, since the rear cross member 16 and the floor cross member 32 connecting the left and right side sills 11 in the vehicle width direction are connected by the floor frame 33 extending in the fore-and-aft direction, a high stiffness rectangular skeleton that is resistant to deformation is formed from the side sill 11, the floor cross member 32, the floor frame 33, and the rear cross member 16. It is therefore possible to protect the battery box 36 disposed therebeneath from the collision load of a rear-end collision and to reliably transmit and disperse the collision load from the rear frame 12 to the side sill 11.

Figure 6:
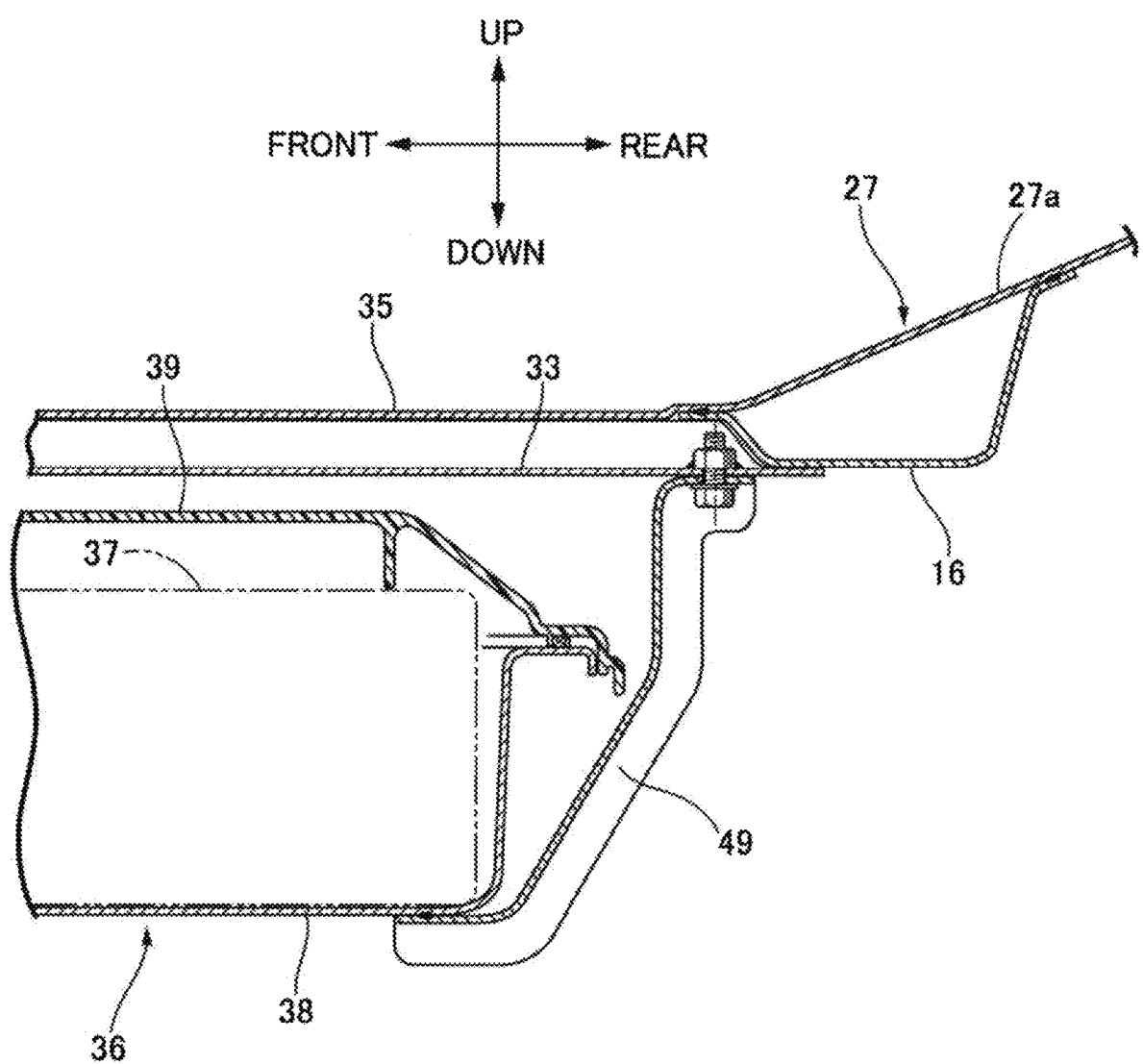
FIG. 6 is a sectional view along line 6-6 in FIG. 3. (first embodiment)

Moreover, since the upwardly-bulging portion 27*a* of the rear floor panel 27 extends upward to the rear from the rear end of the floor panel 35, and the rear end of the floor frame 33 disposed in the fore-and-aft direction on a lower face of the floor panel 35 is connected to the lower face of the rear cross member 16 disposed in the vehicle width direction on a lower face of the upwardly-bulging portion 27*a* of the rear floor panel 27, even if the height of the floor frame 33 is reduced in order to increase the volume of the battery box 36, it is possible to transmit the collision load of a rear-end collision from the rear cross member 16 to the floor frame 33 (see FIG. 6).

An embodiment of the present invention is explained above, but the present invention may be modified in a variety of ways as long as the modifications do not depart from the subject matter.

For example, in the embodiment an electric automobile is illustrated, but the present invention may be applied to an automobile other than an electric automobile.

The invention claimed is:

1. A body structure for automobiles in which front ends of a pair of left and right rear frames made of a hot stamp material are connected to rear ends of a pair of left and right side sills made of a high tensile material,
wherein the rear frame comprises an inclined part that is inclined inward in a vehicle width direction in going rearward and a horizontal part that extends substantially horizontally rearward from a rear end of the inclined part, a rear part of the side sill comprises a first enlarged width portion that increases in width inwardly in the vehicle width direction via a bent portion a front part of the inclined part of the rear frame comprises a second enlarged width portion that increases in width outwardly in the vehicle width direction, a rear end of the first enlarged width portion and a front end of the second enlarged width portion are connected, and an inner wall in the vehicle width direction of the first enlarged width portion and an inner wall in the vehicle width direction of the inclined part are linearly continuous in plan view.

2. The body structure for automobiles according to claim 1, wherein the structure comprises a battery box mounted in a lower part of a vehicle body, the bent portion of the side sill opposes a corner portion in a rear part of the battery box and the inclined parts of the left and right rear frames are connected by a rear cross member extending in the vehicle width direction.

3. The body stricture for automobiles according to claim 2, wherein the inclined part of the rear frame and the rear cross member are connected by a reinforcing member having a triangular shape in plan view.

4. The body structure for automobiles according to claim 3, wherein the rear cross member and a floor cross member providing a connection between the left and right side sills in the vehicle width direction are connected by a floor frame extending in a fore-and-aft direction.

5. The body structure for automobiles according to claim 2, wherein the side sill is formed into a closed cross-section by joining an outer member and an inner member, the inner member has a U-shaped cross section opening outward in the vehicle width direction while having an upper wall, a side wall and a lower wall, opposite side edges in the vehicle width direction of a floor panel are connected to the upper wall, the battery box is connected to the lower wall, and the side wall opposes a peripheral wall portion of the battery box.

6. The body structure for automobiles according to claim 2, wherein the inclined part of the rear frame is also inclined upward in going rearward the structure comprises a subframe disposed between the left and right rear frames, and the subframe is supported on the inclined part so as to oppose a rear face of the battery box.

7. The body structure for automobiles according to claim 1, wherein the structure comprises a rear floor panel having formed thereon an upwardly-bulging portion inclined upward in going rearward from the rear end of a floor panel, and the floor panel has a floor frame disposed on a lower face thereof in the fore-and-aft direction, the rear end of the floor frame being connected to a lower face of a rear cross member disposed on a lower face of the upwardly-bulging portion of the rear floor panel in the vehicle width direction.

8. The body structure for automobiles according to claim 1, wherein a front part of the side sill is formed from a material having higher strength than the strength of a rear part thereof, the front part of the side sill is connected to a front side frame by a brace member, the left and right side sills are connected by a floor cross member extending in the vehicle width direction, and the rear frame is connected to the rear part of the side sill.

9. The body structure for automobiles according to claim 1, wherein a bulkhead is disposed at the front end of the second enlarged width portion of the rear frame.

10. The body structure for automobiles according to claim 9, wherein the structure comprises a subframe disposed between the left and right rear frames and a fastening part on a front side of the subframe is provided in a vicinity of the bulkhead of the rear frame.

\* \* \* \* \*